United States Patent [19]

Young et al.

[11] 4,333,901

[45] Jun. 8, 1982

[54] MOLDING ARTICLES OF THERMOPLASTIC RUBBER

[75] Inventors: Gerald T. Young, Conway, N.H.; Michael R. Easterling, Windsor; Robert E. Dukeshire, Hartland, both of Vt.

[73] Assignee: The Goodyear Tire & Rubber Company, Akron, Ohio

[21] Appl. No.: 150,474

[22] Filed: May 16, 1980

[51] Int. Cl.³ ............................................... B29F 1/00
[52] U.S. Cl. ...................................................... 264/85
[58] Field of Search .......................................... 264/85

[56] References Cited

U.S. PATENT DOCUMENTS 3,044,118  7/1962  Bernhardt ............................. 264/85
3,789,093  1/1974  Bose .................................. 264/85 X Primary Examiner—Thomas P. Pavelko
Attorney, Agent, or Firm—D. M. Ronyak

[57] ABSTRACT

Articles having a relatively smooth and homogeneous surface appearance may be injection molded of thermoplastic rubber on relatively low-injection-speed-and-pressure equipment. To reduce or eliminate the hairy or frosted surface appearance which otherwise commonly occurs, the mold cavity is pressurized with a relatively moisture-free compressed gas before and during a majority of the injection phase of the molding cycle.

8 Claims, No Drawings

MOLDING ARTICLES OF THERMOPLASTIC RUBBER

The abstract is not to be taken as limiting the invention of this application and in order to understand the full nature and extent of the technical disclosure of this application reference must be made to the following detailed description.

This invention relates to molding of articles of thermoplastic rubber. The invention is particularly useful in the molding of small articles, for example, shoe components of thermoplastic rubber compounds on low-pressure-and-injection-speed molding equipment. For example, such equipment typically develops pressures such that a 70 square inch mold cavity may be restrained by a mechanism having a 20 ton maximum clamping force between its two platens.

Heretofore in the production of shoe components such as soles, heels and shoe bottoms or the like, when one of these articles is made of thermoplastic rubber by injection of the molten thermoplastic rubber material into a cold mold cavity, the resultant article commonly has what may be termed as a hairy or frosted appearance. The article's surface is somewhat rough and nonhomogeneous and randomly textured.

In contrast to the surface appearance just described, an article manufactured in accordance with the process described herein has a surface which is relatively smooth and homogeneous and of gelatinoid appearance.

According to an aspect of the invention there is provided a method of molding articles of thermoplastic rubber by low pressure and rate injection of a mass of molten thermoplastic rubber into a cold mold cavity comprising:

(a) pressurizing a closed mold cavity with a compressed gas such as compressed air;

(b) beginning injection of molten thermoplastic rubber into the mold after pressurization of the mold cavity with said compressed gas;

(c) terminating the gas pressurization shortly before completing injection of the molten thermoplastic rubber into the mold cavity;

(d) completing injection of the molten thermoplastic rubber into the mold cavity;

(e) allowing the thermoplastic rubber to cool and solidify in the mold;

(f) removing the solidified thermoplastic rubber article from the mold;

It is not well understood at this time why the unsmooth, hairy or frosted appearance occurs when molding articles of thermoplastic rubber compounds according to known processes or why the resultant article attains a relatively smooth appearance having some luster when the process described herein is employed. One hypothesis is that the compounds commercially available for such molding, at least those compounds based on block copolymers of styrene-butadiene-rubber have an equilibrium moisture content greater than that which will provide a relatively smooth appearance. It is hypothesized that the pressurized gas in the mold somehow forces the moisture to stay within the compound and effectively forces the compound against the sides of the mold resulting in a molded article having a smooth appearance. However, this is only an hypothesis and is not to be taken as limiting the process of the invention as described herein.

A suitable gas for pressurization of the mold cavity prior to and during the major portion of the thermoplastic rubber injection into the mold cavity is compressed air normally available in an industrial plant. The industrial plant air system is provided with an additional after cooler or water separator to provide the requisite relatively moisture free air for the process. Desiccant dryers in the air system have not been found to be necessary to achieve the desired result in the molded articles, although they may be employed if the moisture level in the plant air system is not otherwise reduced to a sufficiently low level. Although compressed air has been successfully used, it is believed that other compressed gases which are relatively moisture free and inert when in contact with the molten thermoplastic rubber may be employed.

When employing the type of equipment to be described herein it has been found that the gas pressure should be at least about 50 pounds per square inch gauge; 100 pounds per square inch gauge have been successfully employed; and at least 75 pounds per square inch gauge is preferred. Higher values have not been evaluated, but it is believed that as long as the gas pressure is less than the pressure of the molten thermoplastic rubber as it is injected into the mold cavity from the extruder that the process can be practiced effectively. On equipment differing from that described herein, a degree of experimentation may be needed to determine the amount of gas pressure needed to achieve the desired smooth surface on the molded article.

The mold cavity is pressurized with the compressed gas from a time commencing prior to beginning injection of the molten thermoplastic rubber into the mold cavity and continues until the mold cavity is nearly filled with the thermoplastic rubber. When a low speed screw type extruder is employed for injection of the molten thermoplastic rubber, a time of from about 10 to 18 seconds is typically required to fill a typical mold cavity of 300 to 600 cubic centimeters with molten thermoplastic rubber material. The gas pressurization of the mold cavity is terminated about 1 or 2 seconds prior to completion of filling of the mold cavity with molten thermoplastic rubber. The point of release of the gas pressure must also be tuned to the specific equipment and material employed in practicing the process. A recommended starting point is to leave the gas pressure on through about 90 percent of the thermoplastic rubber injection phase of the cycle.

The mold cavities employed in this process are typically formed of metal and are continuously cooled indirectly by cooling of the platens on which the molds are located. It is important that each mold cavity seal tightly such that introduction of the compressed gas into the cavity results in a significant buildup of gas pressure within the cavity. All outlets of the mold should be closed and a gasket surrounding the cavity or cavities may be needed to achieve pressurization. Of course, if the opposed surfaces of the mold mate adequately to provide sufficient sealing, a gasket may be unnecessary. This is to be established on an individual mold basis.

The gas pressurization cycle may be coordinated with the injection phase of the cycle, that is, to the extruder, via a timer and appropriate valving. In a typical installation, a screw type extruder injects the molten thermoplastic rubber material which is at from about 280° F. to about 340° F. into a cold mold cavity which is at about 65° F. to about 95° F. With a screw type extruder it is relatively easy to know when the filling portion of the cycle is near completion since the amperage on the screw drive motor significantly increases as the mold cavity becomes completely filled. The extruder typically injects the thermoplastic rubber material into a manifold arrangement which in turn communicates to several mold cavities. The pressurized gas is communicated into each cavity directly through a separate orifice other than that through which the molten thermoplastic rubber flows into each cavity. A common regulator may be employed for gas pressurization of all mold cavities on a given injection extruder.

While certain representative embodiments and details have been described for the purpose of illustrating the invention, it will be apparent to those skilled in this art that various changes and modifications may be made therein without departing from the spirit or scope of the invention.

What is claimed is:

1. A method for providing a relatively smooth surface to an injection molded article of thermoplastic rubber comprising:
    (a) providing a source of relatively moisture-free pressurized gas and a cold mold that when closed defines a sealed mold cavity;
    (b) pressurizing the mold cavity with the relatively moisture-free gas prior to and during low pressure and speed injection of molten thermoplastic rubber into the mold cavity, the pressure of the gas being at least 50 pounds per square inch gauge but less than the pressure of the molten thermoplastic rubber as it is injected into the mold cavity;
    (c) maintaining said gas pressurization while injecting molten thermoplastic rubber into said mold cavity;
    (d) terminating the source of said gas pressurization about 1 to 2 seconds prior to completion of filling of the mold cavity with thermoplastic rubber;
    (e) completing filling of the mold cavity with thermoplastic rubber; and
    (f) allowing the thermoplastic rubber to solidify, then opening the mold and removing the thermoplastic rubber article from the mold cavity.

2. The method of claim 1 wherein the thermoplastic rubber is a block polymer of styrene butadiene rubber, and the mold cavity has a temperature from about 65° F. to about 95° F. at the beginning of the molding cycle.

3. A method of molding an article of thermoplastic rubber by low pressure and rate injection of a mass of molten thermoplastic rubber into a cold mold that defines a sealed mold cavity when closed comprising the following sequence of steps:
    (a) closing the mold to define a sealed mold cavity;
    (b) providing a source of compressed gas;
    (c) pressurizing the mold cavity with a compressed gas from the source of compressed gas;
    (d) beginning injection of molten thermoplastic rubber into the mold cavity while maintaining pressurization of the mold cavity with said compressed gas;
    (e) terminating the source of gas pressurization of the mold cavity shortly before completing injection of the molten thermoplastic rubber into the mold cavity;
    (f) completing injection of the molten thermoplastic rubber into the mold cavity;
    (g) allowing the thermoplastic rubber to cool and solidify into an article in the mold cavity; and
    (h) opening the mold and removing the solidified thermoplastic rubber article from the mold cavity.

4. The method of claim 3 wherein the gas is relatively moisture free compressed air.

5. The method of claim 3 wherein gas pressurization of the mold cavity begins just prior to injection of the molten thermoplastic rubber into the mold cavity, injection of the thermoplastic rubber continues over a period of about 10 to 18 seconds, and termination of gas pressurization of the mold cavity occurs about 1 to 2 seconds prior to completion of injection of the thermoplastic rubber into the mold cavity.

6. The method of claim 3 wherein the mold cavity is pressurized via an orifice separate from that through which the molten thermoplastic rubber is injected into the mold cavity.

7. The method of claim 3 wherein the pressure of the gas is from about 50 to 100 pounds per square inch gauge.

8. The method of claim 3 wherein the pressure of the gas is at least 75 pounds per square inch gauge and less than the pressure with which the molten thermoplastic rubber is injected into the mold cavity.

* * * * *